April 27, 1954 G. E. BURWELL 2,677,011
TELETYPEWRITER MESSAGE IDENTIFICATION SYSTEM
Filed Sept. 12, 1950
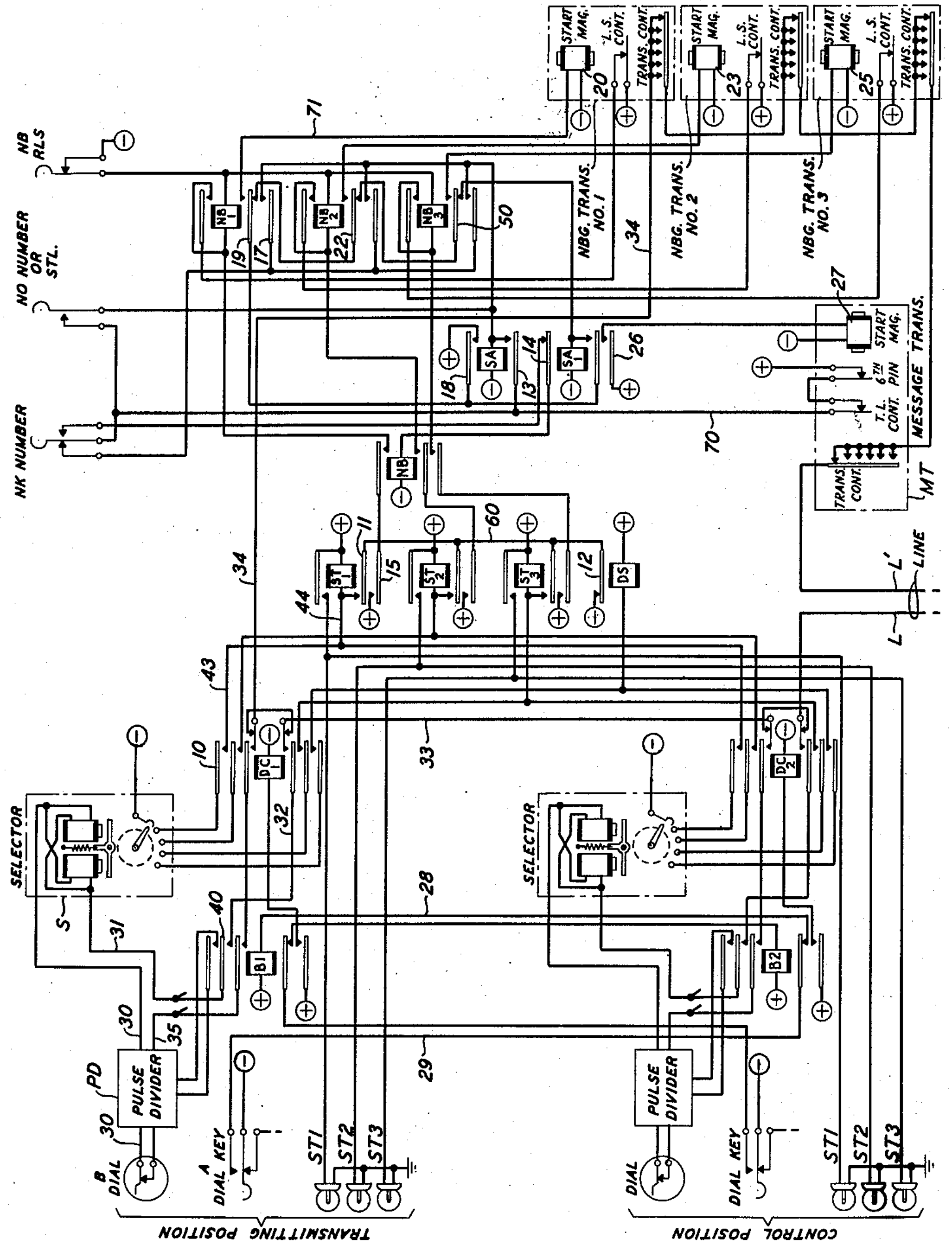
INVENTOR
G. E. BURWELL
BY
H. A. Patterson
ATTORNEY Patented Apr. 27, 1954 2,677,011

UNITED STATES PATENT OFFICE 2,677,011

TELETYPEWRITER MESSAGE IDENTIFICATION SYSTEM

Gordon E. Burwell, Port Washington, N. Y., assignor to American Telephone and Telegraph Company, a corporation of New York Application September 12, 1950, Serial No. 184,424

4 Claims. (Cl. 178—2)

This invention relates to a message numbering system for numbering messages transmitted to the stations on a party line so that the messages received at each station shall be numbered in sequence. It includes numbering transmitters located at a message originating station and allocated individually to the several party line stations. Upon the transmission of the calling codes for the one or more stations that are to receive a message the numbering transmitters respectively allocated to them are conditioned for operation. After the station calling codes have been transmitted, a start key is operated which causes the numbering transmitters that have been conditioned for operation to transmit in succession, station identifying signals and message number signals, the indicia transmitted from all of the numbering transmitters being received at all of the selected stations. Following the operation of the last number transmitter the message transmitter is automatically started and the message is transmitted to all of the selected stations.

Referring to the drawing which represents a diagrammatic representation of the system, the circuit arrangement consists of the following types of apparatus:

(1) Numbering transmitters which are arranged to transmit prepunched tape. These transmitters are provided on the basis of one per station for each multipoint teletypewriter circuit;

(2) A message transmitter to transmit the message tape;

(3) A dialing circuit which is used to connect the station or stations on the circuit to which a message is to be transmitted; and (4) A receiving selector which responds to the dial impulses and selects the numbering transmitter or transmitters corresponding to the station or stations which are dialed.

When an operator decides to send a message to station No. 1 on a circuit or transmission channel L, L', the dial key A at the transmitting position is depressed and is held down while the code to connect that station is dialed, which takes place later. B indicates the dial which transmits the code. This will be described later.

Operation of the dialing key A at the transmitting station operates relay B1, provided relay B2 at the control position is normal. The circuit for relay B1 leads from positive battery, relay B1, conductor 28, closed contact of relay B2, conductor 29, contact of the dial key A, now closed, to negative battery. Operation of relay B1 operates relay DC1, through an obvious circuit, which relay connects the dialing circuit in series with the teletypewriter circuit on transmission line L, L' to which the desired station is connected. This circuit is as follows: Dial contact B, conductor 30, pulse divider PD, conductor 30, selector S, conductor 31, armature 40 and front contact of relay B1, conductor 32, inner armature and front contact of relay DC1, conductor 33, armatures and back contacts of relay DC2, one side L of the line to which the stations, not shown, are connected, the other side L' of the line, transmitter contact of the message transmitter MT, transmitter contacts of the numbering transmitters Nos. 1, 2 and 3, conductor 34, inner armature and front contact of relay DC1, inner armature and front contact of relay B1, conductor 35, pulse divider PD, dial contact. The pulse divider is disclosed in Patent No. 2,374,908 issued May 1, 1945, to Allan Weaver. The multipoint teletypewriter circuit having three stations is connected to line L, L'. As stated, this teletypewriter circuit with its three stations and accompanying circuits and equipment is not shown because it is shown and described in detail in Patent No. 2,331,914, issued October 19, 1943, to Stephen Janiszewski. Operation of relay B1 also opens the operating path of relay B2 and prevents dialing from the control position on the same circuit simultaneously.

Dialing of the proper code for station 1 on line L, L' connects the teletypewriter at station 1 to the circuit just traced and starts its motor in operation. Dialing of the proper code for station 1 also operates the local selector S to the contact point corresponding to station 1, which momentarily connects negative battery through contact 1 of selector S and the now closed contact 10 of relay DC1, conductors 43, 44, relay ST1 to positive battery. Relay ST1 locks through its armature 11, conductor 60 and the normally closed contact 12 of relay DS to negative battery, and closes a circuit to light the indicator lamps ST1 at both the transmitting and control positions.

The tape to be transmitted to station 1 is now inserted in the message transmitter MT as shown in said Janiszewski patent and the tape lever TL is released which connects battery from the transmitter through the sixth pin contact and the tape lever contact as shown in said patent to the center point of the number key NK. This battery is also connected to the normally open contact 13 of relay SA to prepare a locking path for that relay.

The number key is now operated momentarily as a step in the process of providing that the message to be sent is preceded by a number. The operation of the number key connects battery from the message transmitter through the sixth pin contact, the TL contact, conductor 70, right-hand number key contact now held closed by the operator, normally closed contact 14 of the relay SA1, relay NB to negative battery. Operation of relay NB connects battery through the operated contact 15 of relay ST1, front contact of relay NB, relay NB1, to negative battery at release key RLS. Relay NB1 closes a locking circuit for itself from negative battery at key RLS to positive battery at letters contact LS. When the number key is released to normal position by the operator, relay NB is released and positive battery from the message transmitter is now connected through the normally closed contacts of the number key and the now operated contact 17 of relay NB1 to relay SA to negative battery. Relay SA operates and locks through its own contact to battery at the message transmitter. It also connects battery through its contact 18, the now operated contact 19 of relay NB1, conductor 71 to the start magnet of numbering transmitter No. 1 causing it to start sending.

The numbering transmitter No. 1 sends the characters punched in the number tape which consist of a designation code of station No. 1, a message number in the series for station No. 1, and any other desired information, followed by the letters character as shown and described in said Janiszewski patent. The designation code preceding the message number serves to indicate at a receiving station that a message number thereafter received is in the numbering series for the designated station, or which of two or more numbers received at a receiving station preceding a message is in the series of numbers pertaining to that station since, in the case of multiple address messages, all of the stations selectively associated with the transmission channel for reception of a message receive all of the message numbers and the accompanying station designations preceding that message. When the numbering transmitter No. 1 sensing pins sense the letters character, a letters sensing contact LS thereat opens momentarily, removing positive battery from the locking path of relay NB1, causing it to release. The mechanism for opening the letters sensing contact momentarily is shown in detail in said Janiszewski patent, Figs. 1, 2 and 3 and described in detail on page 2, line 38 to page 3, line 24. When the relay NB1 releases, the battery from contact 18 of relay SA is connected through the now closed position of its transfer contact 19 and the armature 22 and back contact of relay NB2 and armature 50 and back contact of relay NB3 to operate relay SA1 and to close the circuit of magnet 27 to start the message transmitter MT.

As soon as the end of the message tape passes through the transmitter, the sixth pin operates, restoring the circuit to normal, as shown and described in said patents.

For multiaddress messages addressed to stations 1, 2 and 3 the local receiving selector on receiving the proper codes will cause relays ST1, ST2 and ST3 to operate in the same manner previously described for a call to station 1 only. The receiving selectors at stations 1, 2 and 3 also respond to the station selecting codes and set in operation the motors at those stations, as in the case of a call for a single station.

When the number key and the associated NB relays are operated, ground will be connected through each of relays ST1, ST2 and ST3 to operate relays NB1, NB2 and NB3.

More in detail, when the number key is released relay SA operates as before and applies battery through armature 18 and front contact of relay SA, the transfer contact 19 of relay NB1 to start magnet 20 to start the numbering transmitter No. 1. When the letters character is sensed by this transmitter the letters sensing contact opens and releases relay NB1 as before. Relay NB1 in releasing transfers battery from the armature 18 of relay SA through back contact 19 of relay NB1 through the front contact 22 of relay NB2 to the magnet 23 to start numbering transmitter No. 2. When this transmitter senses the letters character, relay NB2 is released and closes a circuit from battery connected to armature 18 of relay SA, armature 19 and back contact of relay NB1, armature 22 and back contact of relay NB2, armature 50 and front contact of relay NB3 to magnet 25 of numbering transmitter No. 3. When this transmitter senses the letters contact, relay NB3 releases, causing the battery connected to the armature of relay SA to be transferred to relay SA1 which operates and its armature 26 connects battery to the start magnet 21 of the message transmitter MT. Thus in the case of multiaddress messages addressed to stations 1, 2 and 3 on line L, L' the numbering transmitters 1, 2 and 3 send designation codes and message numbers respectively before the messages are transmitted. Stations, such as 1, 2 and 3, that have been selectively associated with the transmission channel receive all signals transmitted over that channel. Accordingly, each of the stations receives and records the message numbers and designation codes pertaining to the other selectively associated stations as well as the message number and designation code pertaining to itself. The designation codes indicate at each station the message number that is in the series for that station, and station attendants merely disregard the other message numbers received accompanying any message.

If it is desired to send a message without a preceding message number, it is only necessary to operate the no-number key STL instead of the number key. This operation connects battery from the message transmitter directly to relay SA, causing it to operate. Since none of the number relays NB1, NB2, etc., is operated, battery from relay SA passes through their normally closed contacts and immediately operates relay SA1, which at its armature 26 and front contact closes the circuit of magnet 27 of the message transmitter.

The number release key NB—RLS is provided in case number key is inadvertently operated and it is desired to correct the error by releasing all operated NB relays.

While the circuit arrangement shows equipment for a three-station circuit, it is to be understood that it may be expanded to include any desired number of stations.

What is claimed is:

1. In a teletypewriter system having a channel of transmission and a plurality of receiving stations selectively associable individually or plurally therewith for message reception, and a message transmitter associated with said channel, the combination with auxiliary numbering transmitters, one for each receiving station, associated with said transmission channel, a number key operable to operate means to energize the start magnet of the numbering transmitter corresponding to a receiving station theretofore selectively associated with said channel and cause it to start sending a designation code of said station, a message number in the series for said station and a letters combination character over said transmission channel, means responsive to the transmission of said letters character to start the message transmitter, and means actuated when the message tape passes through the message transmitter to restore the circuits to normal.

2. In a teletypewriter system having a channel of transmission and a plurality of receiving stations selectively associable individually or plurally therewith for message reception, and a message transmitter associated with said channel, the combination with auxiliary numbering transmitters, one for each receiving station, associated with said transmission channel, a number key operable to operate means to energize the start magnet of the numbering transmitter corresponding to a receiving station theretofore selectively associated with said channel and cause it to start sending a designation code of said station, a message number in the series for said station and a letters combination character over said transmission channel, and means operated by the transmission of said letters character operating means to energize the start magnet of the numbering transmitter corresponding to another receiving station theretofore selectively associated with said channel and cause it to start sending a designation code of said second station, a message number in the series code for said second station, and a letters character over said transmission channel, means responsive to the transmission of said letters character to start the message register, and means actuated when the message tape passes through the message transmitter to restore the circuits to normal.

3. In a teletypewriter system having a line and a number of receiving stations selectively associable individually or plurally therewith for message reception, and a message transmitter associated with said line, said message transmitter being located at a station on said line other than said receiving stations, means controllable over said line from said transmitting station for selectively functionally associating said receiving stations individually or plurally with said line, in combination with auxiliary transmitting means for causing message transmission from said message transmitter to be preceded by signals representative of message numbers in ordinal sequential relation to the last previously transmitted number signals for each of the receiving stations selectively associated with said line to receive the message, said number signals and messages utilizing said line in common.

4. In a teletypewriter system having a transmission line and a number of receiving stations selectively associable individually or plurally therewith for message reception, and a message transmitter associated with said transmission line, said message transmitter being located at a station on said line other than said receiving stations, means controllable over said line from said transmitting station for selectively functionally associating said receiving stations individually or plurally with said line, in combination with auxiliary transmitting means for causing message transmission from said message transmitter to be preceded by signals representative of message numbers in ordinal sequential relation to the last previously transmitted number signals for each of the receiving stations selectively associated with said line to receive the message, said number signals and messages being both transmitted over said line.

References Cited in the file of this patent

UNITED STATES PATENTS

| Number | Name | Date |
|---|---|---|
| 2,193,809 | Dirkes et al. | Mar. 10, 1940 |
| 2,346,173 | Light | Apr. 11, 1944 |
| 2,419,581 | Marshal et al. | Apr. 29, 1947 |
| 2,484,838 | Light | Oct. 18, 1949 |
| 2,572,831 | Bacon | Oct. 30, 1951 |
| 2,587,253 | Vernan | Feb. 26, 1952 |